United States Patent
Watanabe

(10) Patent No.: US 12,390,694 B2
(45) Date of Patent: Aug. 19, 2025

(54) MULTI-PIECE SOLID GOLF BALL

(71) Applicant: Bridgestone Sports Co., Ltd., Tokyo (JP)

(72) Inventor: Hideo Watanabe, Saitamaken (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 0 days.

(21) Appl. No.: 18/355,094

(22) Filed: Jul. 19, 2023

(65) Prior Publication Data

US 2024/0075349 A1 Mar. 7, 2024

(30) Foreign Application Priority Data

Sep. 6, 2022 (JP) .................. 2022-141169

(51) Int. Cl.
| | | |
|---|---|---|
| *A63B 37/06* | (2006.01) | |
| *A63B 37/00* | (2006.01) | |
| *C08L 9/06* | (2006.01) | |

(52) U.S. Cl.
CPC ...... *A63B 37/0075* (2013.01); *A63B 37/0063* (2013.01); *A63B 37/0065* (2013.01); *A63B 37/0084* (2013.01); *A63B 37/00922* (2020.08); *C08L 9/06* (2013.01)

(58) Field of Classification Search
CPC .......... A63B 37/0075; A63B 37/00922; A63B 37/0063
See application file for complete search history.

(56) References Cited

U.S. PATENT DOCUMENTS

| | | |
|---|---|---|
| 2012/0277020 A1 | 11/2012 | Higuchi et al. |
| 2013/0095955 A1 | 4/2013 | Higuchi et al. |
| 2013/0172106 A1 | 7/2013 | Shinohara |
| 2013/0172107 A1 | 7/2013 | Higuchi et al. |
| 2013/0172108 A1* | 7/2013 | Higuchi ............. A63B 37/0017 473/372 |
| 2021/0205668 A1* | 7/2021 | Watanabe .......... A63B 37/0076 |

FOREIGN PATENT DOCUMENTS

| | | |
|---|---|---|
| JP | 2012-228470 A | 11/2012 |
| JP | 2013-138839 A | 7/2013 |
| JP | 2013-138840 A | 7/2013 |
| JP | 2013-138857 A | 7/2013 |
| JP | 2014-069045 A | 4/2014 |

* cited by examiner

*Primary Examiner* — Raeann Gorden
(74) *Attorney, Agent, or Firm* — Sughrue Mion, PLLC

(57) ABSTRACT

In a golf ball having a core, an intermediate layer and a cover, the ball and the sphere obtained by encasing the core with the intermediate layer have respective surface hardnesses such that (surface hardness of ball)<(surface hardness of intermediate layer-encased sphere); the ball has an initial velocity of ≤75.0 m/s; and the core has a hardness profile in which the center hardness, the hardness at a midpoint between the core center and core surface, and the hardnesses at specific positions inward from the midpoint and at specific positions outward from the midpoint are optimized. Given the possibility that the rules limiting the distance traveled by a golf ball on shots by long hitters will change, this ball reduces the drop-off in distance on driver shots and iron shots taken by average hitters while increasing the drop-off in distance on driver shots taken by long hitters.

6 Claims, 4 Drawing Sheets

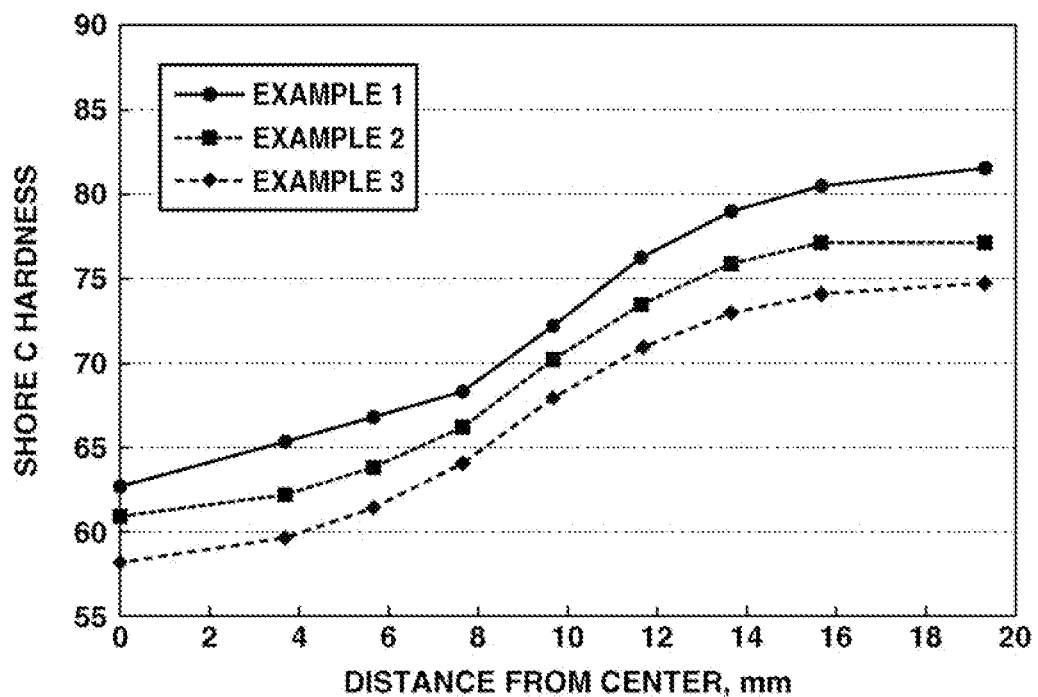

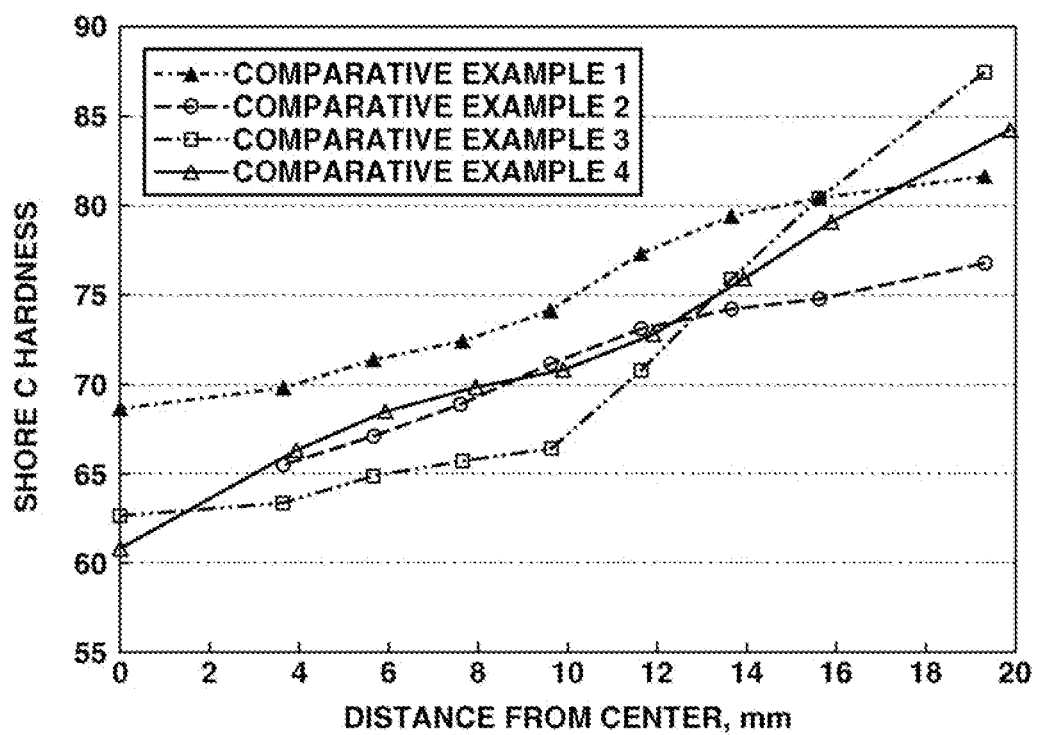

MULTI-PIECE SOLID GOLF BALL

CROSS-REFERENCE TO RELATED APPLICATIONS

This non-provisional application claims priority under 35 U.S.C. § 119(a) on Patent Application No. 2022-141169 filed in Japan on Sep. 6, 2022, the entire contents of which are hereby incorporated by reference.

TECHNICAL FIELD

The present invention relates to a multi-piece solid golf ball having a core, an intermediate layer and a cover.

BACKGROUND ART

In March 2022, the Royal and Ancient Golf Club of St. Andrews (R&S) and the United States Golf Association (USGA) notified manufacturers of golf balls that, because of future changes in the Overall Distance Standard (ODS) test conditions for golf balls, they will begin research on limiting the total distance of long hitters. It would thus be desirable to create a golf ball which does not simply reduce the total distance but, by making the drop-off in distance on driver shots and iron shots taken by average hitters smaller while making the drop-off in distance on driver shots taken by long hitters larger, minimizes the effects on play other than to reduce the total distance on driver shots taken by long hitters. Also, to keep a golf ball which has a reduced distance owing to this change from feeling strange to the professional golfer and the skilled amateur, the ball should be designed so as to have a performance which, in terms of the spin properties in the short game and the feel on impact, approximates that of balls currently in use on the tour.

In the past, a number of golf balls which limit the ball initial velocity to not more than 75.0 m/s have been described in the literature. Examples of such disclosures include JP-A 2012-228470, JP-A 2014, 069045, JP-A 2013-138857, JP-A 2013-138839 and JP A 2013-138840.

However, all of these prior-art golf balls are driving range practice balls which are designed simply to travel a shorter distance than game balls. Although the distance traveled by the ball on driver (W #1) shots by a long hitter is indeed reduced, a golf ball design that makes the drop-off in distance for the average hitter smaller than the drop-off in distance for a long hitter has not yet been created.

SUMMARY OF THE INVENTION

It is therefore an object of the present invention to provide a golf ball which, given the possibility that the rules limiting the distance traveled by a golf ball when played by long hitters will change on account of future changes in the ODS test conditions for golf balls, does not simply reduce the distance but, by making the drop-off in distance on driver shots and iron shots taken by average hitters smaller while making the drop-off in distance on driver shots taken by long hitters larger, minimizes the effect on play other than to reduce the distance traveled by the ball on driver shots taken by long hitters.

As a result of intensive investigations, I have found that, in a multi-piece solid golf ball having a core, an intermediate layer and a cover, certain advantageous effects can be achieved by having the surface hardness of the sphere obtained by encasing the core with the intermediate layer and the surface hardness of the ball satisfy the following relationship:

(surface hardness of ball)<(surface hardness of intermediate layer-encased sphere);

by setting the initial velocity of the ball to not more than 75.0 m/s; and by, in the core hardness profile, letting $Cc$ be the Shore C hardness at a center of the core, $Cs$ be the Shore C hardness at a surface of the core, $Cm$ be the Shore C hardness at a midpoint M between the core center and the core surface, $Cm-2$, $Cm-4$ and $Cm-6$ be the respective Shore C hardnesses at positions 2 mm, 4 mm and 6 mm inward from the midpoint M and $Cm+2$, $Cm+4$ and $Cm+6$ be the respective Shore C hardnesses at positions 2 mm, 4 mm and 6 mm outward from the midpoint M and defining surface areas A to F as follows

| | |
|---|---|
| ½×2×($Cm-4-Cm-6$) | surface area A: |
| ½×2×($Cm-2-Cm-4$) | surface area B: |
| ½×2×($Cm-Cm-2$) | surface area C: |
| ½×2×($Cm+2-Cm$) | surface area D: |
| ½×2×($Cm+4-Cm+2$) | surface area E: |
| ½×2×($Cm+6-Cm+4$), | surface area F: | satisfying the condition:

{(surface area $C$+surface area $D$)−(surface area $A$+surface area $B$)}×($Cs-Cc$)≥30.

That is, I have discovered that such a golf ball, by minimizing the drop-off in distance on driver shots and iron shots taken by average hitters while making the drop-off in distance on driver shots taken by long hitters larger, has little effect on play other than to reduce the distance traveled by the ball on driver shots taken by long hitters. Moreover, to keep the golf ball of the invention from feeling strange to the professional golfer and the skilled amateur, it has a performance which, in terms of the spin properties in the short game and the feel at impact, approximates that of balls currently in use on the tour.

As used herein, a "long hitter" refers to a golfer having a head speed on shots with a driver (W #1) of about 50 m/s or more, and an "average hitter" refers to a golfer having a head speed on driver shots of less than about 50 m/s.

Accordingly, the invention provides a multi-piece solid golf ball having a core, an intermediate layer and a cover, wherein the sphere obtained by encasing the core with the intermediate layer has a surface hardness and the ball has a surface hardness which together satisfy the following condition:
(surface hardness of ball)<(surface hardness of intermediate layer-encased sphere); the ball has an initial velocity of not more than 75.0 m/s; and the core has a hardness profile such that, letting $Cc$ be the Shore C hardness at a center of the core, $Cs$ be the Shore C hardness at a surface of the core, $Cm$ be the Shore C hardness at a midpoint M between the core center and the core surface, $Cm-2$, $Cm-4$ and $Cm-6$ be the respective Shore C hardnesses at positions 2 mm, 4 mm and 6 mm inward from the midpoint M and $Cm+2$, $Cm+4$ and $Cm+6$ be the respective Shore C hardnesses at positions 2 mm, 4 mm and 6 mm outward from the midpoint M and defining surface areas A to F as follows $\frac{1}{2} \times 2 \times (Cm-4-Cm-6)$      surface area A:

$\frac{1}{2} \times 2 \times (Cm-2-Cm-4)$      surface area B:

$\frac{1}{2} \times 2 \times (Cm-Cm-2)$      surface area C:

$\frac{1}{2} \times 2 \times (Cm+2-Cm)$      surface area D:

$\frac{1}{2} \times 2 \times (Cm+4-Cm+2)$      surface area E:

$\frac{1}{2} \times 2 \times (Cm+6-Cm+4)$,      surface area F:

the core satisfies the condition:

$\{(\text{surface area } C + \text{surface area } D) - (\text{surface area } A + \text{surface area } B)\} \times (Cs-Cc) \geq 30$.

In a preferred embodiment of the golf ball according to the invention, the ball satisfies the following condition in the core hardness profile: (Cs−Cc) 15.

In another preferred embodiment of the inventive golf ball, the ball satisfies the following condition in the core hardness profile:

surface area $B$<surface area $C$<(surface area $D$+surface area $E$).

In yet another preferred embodiment, the ball satisfies the following condition in the core hardness profile:

surface area $A$ surface area $B$<surface area $C$<(surface area $D$+surface area $E$).

In still another preferred embodiment, letting C, M and B be the respective deflections in millimeters of the core, the intermediate layer-encased sphere and the ball when each is compressed under an initial load of 1,275 N (130 kgf) from an initial load of 98 N (10 kgf), the ball satisfies the following two conditions:

$0.46 \leq C - \leq B \leq 0.85$ $0.25 \leq C - M \leq 0.65$.

In a further preferred embodiment, the core is formed of a rubber composition containing a base rubber, which base rubber includes from 50 to 100 wt % of a styrene butadiene rubber and from 0 to 50 wt % of another diene rubber.

In a still further preferred embodiment, the core is formed of a rubber composition which includes (A) a base rubber, (B) a co-crosslinking agent, (C) water or a metal monocarboxylate and (D) an organic peroxide.

Advantageous Effects of the Invention

The golf ball of the invention, given the possibility that the rules limiting the distance traveled by a golf ball on shots by long hitters will change on account of future changes by the R&A and the USGA in the ODS test conditions for golf balls, does not simply reduce the distance but, by making the drop-off in distance on driver shots and iron shots taken by average hitters smaller while making the drop-off in distance on driver shots taken by long hitters larger, minimizes the effects on play other than to reduce the distance traveled by the golf ball on driver shots taken by long hitters. Moreover, to keep this golf ball from feeling strange to the professional golfer and the skilled amateur, it has a performance which, in terms of the spin properties in the short game and the feel on impact, approximates that of balls currently in use on the tour.

BRIEF DESCRIPTION OF THE DRAWINGS

FIG. 3 is a graph showing the core hardness profiles in Examples 1 to 3.

FIG. 4 is a graph showing the core hardness profiles in Comparative Examples 1 to 4.

DETAILED DESCRIPTION OF THE INVENTION

The objects, features and advantages of the invention will become more apparent from the following detailed description taken in conjunction with the appended diagrams.

Figure 1:
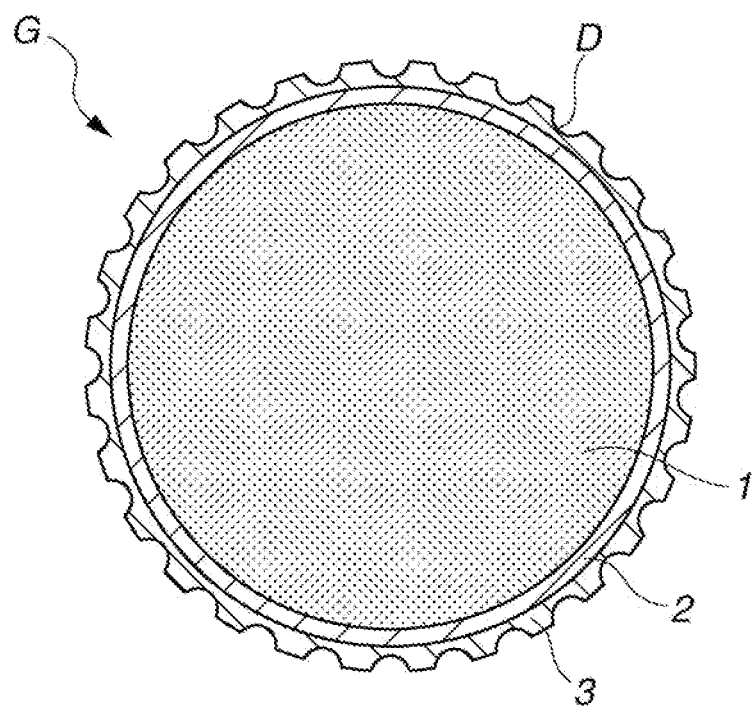
FIG. 1 is a schematic cross-sectional view of a golf ball according to one embodiment of the invention.

The multi-piece solid golf ball of the invention, as illustrated in FIG. 1, has a core, an intermediate layer and a cover. The golf ball G shown in FIG. 1 has a single-layer core 1, a single intermediate layer 2 encasing the core 1, and a single-layer cover 3 encasing the intermediate layer 2. Excluding a coating layer, the cover 3 is positioned as the outermost layer in the layered construction of the golf ball. The core, intermediate layer and cover may each be composed of a single layer as shown in FIG. 1 or may individually be composed of a plurality of layers. Numerous dimples D are typically formed on the surface of the cover 3 (outermost layer) in order to enhance the aerodynamic properties. Although not shown in the diagram, a coating layer is generally formed on the surface of the cover 3. The layers are each described in detail below.

The core is obtained by vulcanizing a rubber composition composed primarily of a rubber material. When the core material is not a rubber composition, the core rebound is low and so it may not be possible to obtain the desired distance when the ball is hit by an average hitter. This rubber composition is typically obtained by using a base rubber as the chief ingredient and compounding together with this other ingredients such as a co-crosslinking agent, a cross-linking initiator, an inert filler and an organosulfur compound.

The core is preferably formed using a rubber composition which includes components (A) to (D) below:
  (A) a base rubber,
  (B) a co-crosslinking agent,
  (C) water or a metal monocarboxylate, and
  (D) an organic peroxide.

The base rubber (A) includes preferably at least 50 wt %, more preferably at least 55 wt %, and even more preferably at least 60 wt %, of a styrene-butadiene rubber. The upper limit in this content is 100 wt % or less, preferably 90 wt % or less, and more preferably 80 wt % or less. When the compounding ratio of styrene-butadiene rubber is too low, the initial velocity of the ball may become too high and, particularly on driver (W #1) shots by a power hitter, may result in an excessive distance. On the other hand, when the compounding ratio of styrene-butadiene rubber is too high, the initial velocity of the ball may become too low and the distance traveled on driver (W #1) shots and iron shots by the average hitter may drop off excessively.

Solution-polymerized styrene-butadiene rubbers and emulsion-polymerized styrene-butadiene rubbers can be used as the styrene-butadiene rubber. Specific examples of solution-polymerized styrene-butadiene rubbers include solution-polymerized SBR-SL552, SL555 and SL563 from JSR Corporation. Specific examples of emulsion-polymerized styrene-butadiene rubbers include emulsion-polymerized SBR1500, 1502 and 1507 from JSR Corporation.

A diene rubber other than above component (A) may be included. The content of this diene rubber is 0 wt % or more, preferably 10 wt % or more, and more preferably 20 wt % or more. The upper limit is preferably 50 wt % or less, more preferably 45 wt % or less, and even more preferably 40 wt % or less. Polybutadienes, natural rubbers, isoprene rubbers and ethylene-propylene-diene rubbers may be used as this diene rubber.

The co-crosslinking agent (B) is an $\alpha,\beta$-unsaturated carboxylic acid and/or a metal salt thereof. Specific examples of unsaturated carboxylic acids include acrylic acid, methacrylic acid, maleic acid and fumaric acid; the use of acrylic acid and methacrylic acid is especially preferred. Exemplary metal salts of unsaturated carboxylic acids include, without particular limitation, the above unsaturated carboxylic acids that have been neutralized with desired metallic ions. Specific examples include zinc salts and magnesium salts of methacrylic acid and acrylic acid. The use of zinc acrylate is especially preferred.

The amount of unsaturated carboxylic acid and/or metal salt thereof included per 100 parts by weight of the base rubber is typically at least 5 parts by weight, preferably at least 9 parts by weight, and more preferably at least 13 parts by weight. The upper limit is typically not more than 60 parts by weight, preferably not more than 50 parts by weight, and more preferably not more than 40 parts by weight. When too much is included, the core may become too hard, giving the ball an unpleasant feel at impact; when too little is included, the ball rebound may decrease.

The water (C) is not particularly limited, and may be distilled water or tap water. The use of distilled water that is free of impurities is especially desirable. The amount of water included per 100 parts by weight of the base rubber is preferably at least 0.1 part by weight, and more preferably at least 0.2 part by weight. The upper limit is preferably not more than 2 parts by weight, and more preferably not more than 1 part by weight.

Decomposition of the organic peroxide within the core formulation can be promoted by the direct addition of water or a water-containing material as component (C) to the core material. The decomposition efficiency of the organic peroxide within the core-forming rubber composition is known to change with temperature; starting at a given temperature, the decomposition efficiency rises with increasing temperature. If the temperature is too high, the amount of decomposed radicals rises excessively, leading to recombination between radicals and, ultimately, deactivation. As a result, fewer radicals act effectively in crosslinking. Here, when a heat of decomposition is generated by decomposition of the organic peroxide at the time of core vulcanization, the vicinity of the core surface remains at substantially the same temperature as the temperature of the vulcanization mold, but the temperature near the core center, due to the build-up of heat of decomposition by the organic peroxide which has decomposed from the outside, becomes considerably higher than the mold temperature. In cases where water or a water-containing material is added directly to the core, because the water acts to promote decomposition of the organic peroxide, radical reactions like those described above can be made to differ at the core center and core surface. That is, decomposition of the organic peroxide is further promoted near the center of the core, bringing about greater radical deactivation, which leads to a further decrease in the amount of active radicals. As a result, it is possible to obtain a core in which the crosslink densities at the core center and the core surface differ markedly. It is also possible to obtain a core having different dynamic viscoelastic properties at the core center.

A metal monocarboxylate may be used instead of the above water. In a metal monocarboxylate, the carboxylic acid is presumably coordination bonded to the metal atom, which differentiates such compounds from metal dicarboxylates such as zinc diacrylate of the chemical formula $[CH2{=}CHCOO]_2Zn$. Because a metal monocarboxylate furnishes the rubber composition with water by way of a dehydrative condensation reaction, an effect similar to that of water can be obtained. Also, a metal monocarboxylate can be included in the rubber composition as a powder, which enables the operations to be simplified and makes uniform dispersion within the rubber composition easy. Effectively carrying out this reaction requires the use of a monosalt. The amount of metal monocarboxylate included per 100 parts by weight of the base rubber is preferably at least 1 part by weight, and more preferably at least 3 parts by weight. The upper limit is preferably not more than 60 parts by weight, and more preferably not more than 50 parts by weight. When too little metal monocarboxylate is included, it may be difficult to obtain a suitable crosslink density, which may make it impossible to obtain a sufficient golf ball spin rate-lowering effect. On the other hand, when too much is included, the core becomes too hard, as a result of which it may be difficult to maintain a suitable feel at impact.

Examples of carboxylic acids that may be used include acrylic acid, methacrylic acid, maleic acid, fumaric acid and stearic acid. Examples of the substituting metal include Na, K, Li, Zn, Cu, Mg, Ca, Co, Ni and Pb. Preferred use can be made of Zn. Specific examples of the metal monocarboxylate include zinc monoacrylate and zinc monomethacrylate. The use of zinc monoacrylate is especially preferred.

It is suitable to use an organic peroxide having a relatively high thermal decomposition temperature as the organic peroxide (D). Organic peroxides having a high one-minute half-life temperature of between about 165° C. and about 185° C., such as dialkyl peroxides, may be used. Examples of dialkyl peroxides that may be suitably used include dicumyl peroxide (Percumyl D, from NOF Corporation), 2,5 dimethyl 2,5 di(t butylperoxy)hexane (Perhexa 25B, from NOF Corporation) and di(2 t-butylperoxyisopropyl)benzene (Perbutyl P, from NOF Corporation). Preferred use can be made of dicumyl peroxide. These organic peroxides may be used singly or two or more may be used together. The half-life is one indicator representing the magnitude of the decomposition rate by the organic peroxide, and is expressed as the time required for the original organic peroxide to decompose and the amount of active oxygen therein to fall to one-half. The vulcanization temperature in the core-forming rubber composition is generally in a range of between 120° C. and 190° C.; within this range, an organic peroxide having a high one-minute half-life temperature of between about 165° C. and about 185° C. undergoes relatively slow thermal decomposition. Using the above rubber composition in this invention, it is possible to obtain as the core a crosslinked rubber product having the subsequently described specific internal hardness profile by adjusting the amount of free radicals generated, which amount increases as the vulcanization time elapses.

In addition to above components (A) to (D), the rubber composition may also include, for example, a filler, an antioxidant and an organosulfur compound.

Compounds that may be suitably used as the filler include zinc oxide, barium sulfate and calcium carbonate. These may be of one type used singly or two or more may be used together. The amount of filler included per 100 parts by weight of the base rubber is preferably at least 4 parts by weight, more preferably at least 8 parts by weight, and even more preferably at least 12 parts by weight. The upper limit in the amount of filler included per 100 parts by weight of the base rubber may be set to preferably not more than 50 parts by weight, more preferably not more than 40 parts by weight, and even more preferably not more than 30 parts by weight. When too much or too little filler is included, it may not be possible to obtain a proper weight and a suitable rebound.

Commercial products such as Nocrac NS-6, NS-30, 200 and MB (all from Ouchi Shinko Chemical Industry Co., Ltd.) may be used as the antioxidant. One of these may be used alone or two or more may be used together.

The amount of antioxidant included per 100 parts by weight of the base rubber is not particularly limited, although it is preferably at least 0.05 part by weight, and more preferably at least 0.1 part by weight. The upper limit is preferably not more than 1.0 part by weight, more preferably not more than 0.7 part by weight, and even more preferably not more than 0.5 part by weight. Too much or too little antioxidant may make it impossible to obtain a suitable core hardness gradient, and so a suitable rebound, durability and spin rate-lowering effect on full shots may not be achievable.

An organosulfur compound may be included so as to controllably increase the core rebound. Specifically, it is recommended that thiophenols, thionaphthols, halogenated thiophenols or metal salts of these be included as the organosulfur compound. Specific examples include pentachlorothiophenol, pentafluorothiophenol, pentabromothiophenol, p chlorothiophenol, the zinc salt of pentachlorothiophenol, and any of the following having 2 to 4 sulfur atoms: diphenylpolysulfides, dibenzylpolysulfides, dibenzoylpolysulfides, dibenzothiazoylpolysulfides and dithiobenzoylpolysulfides. The use of diphenyldisulfide or the zinc salt of pentachlorothiophenol is especially preferred.

The organosulfur compound is included in an amount per 100 parts by weight of the base rubber that is preferably not more than 5 parts by weight, more preferably not more than 4 parts by weight, even more preferably not more than 3 parts by weight, and most preferably not more than 2 parts by weight. Including too much organosulfur compound may make the core hardness too low or the core rebound too high, as a result of which a good distance may not be obtained on driver shots by a long hitter.

The core can be produced by vulcanizing and curing the rubber composition containing the above ingredients. For example, the core can be produced by using a Banbury mixer, roll mill or other mixing apparatus to intensively mix the rubber composition, subsequently compression molding or injection molding the mixture in a core mold, and curing the resulting molded body by suitably heating it under conditions sufficient to allow the organic peroxide or co-crosslinking agent to act, such as at a temperature of between 100 and 200° C., preferably between 140 and 180° C., for 10 to 40 minutes.

In this invention, the core may be formed as a single layer or as a plurality of layers, although it is preferably formed as a single layer. When a rubber core composed of a plurality of layers is produced, in cases where the hardness difference at the interface between these rubber layers is large, layer separation at the interface may arise when the ball is repeatedly struck, possibly leading to a loss in the initial velocity of the ball on full shots.

The core has a diameter that is preferably at least 36.7 mm, more preferably at least 37.7 mm, and even more preferably at least 38.2 mm. The upper limit in the core diameter is preferably not more than 40.1 mm, more preferably not more than 39.5 mm, and even more preferably not more than 39.0 mm. When the core diameter is too small, the initial velocity of the ball may become too low or the deflection by the ball as a whole may become smaller, ultimately leading to a rise in the spin rate of the ball on full shots, as a result of which the distance desired by the average hitter may not be attainable. On the other hand, when the core diameter is too large, the spin rate on full shots may rise, likewise making the distance desired by the average hitter unattainable, or the durability to cracking on repeated impact may worsen.

The core has a deflection when compressed under a final load of 1,275 N (130 kgf) from an initial load of 98 N (10 kgf) which, although not particularly limited, is preferably at least 2.5 mm, more preferably at least 2.7 mm, and even more preferably at least 2.9 mm. The upper limit is preferably not more than 4.5 mm, more preferably not more than 4.0 mm, and even more preferably not more than 3.7 mm. When the core deflection is too small, i.e., when the core is too hard, the spin rate of the ball may rise excessively, resulting in a poor flight for the average hitter, or the feel at impact may become too hard. On the other hand, when the core deflection is too large, i.e., when the core is too soft, the ball rebound may become too low, resulting in a poor flight for the average hitter, the feel at impact may become too soft, or the durability to cracking on repeated impact may worsen.

Next, the hardness profile of the core is described. The core hardnesses mentioned below refer to Shore C hardnesses. These Shore C hardnesses are hardness values measured with a Shore C durometer in accordance with ASTM D2240.

The core center hardness Cc is preferably at least 54, more preferably at least 56, and even more preferably at least 58. The upper limit is preferably not more than 67, more preferably not more than 65, and even more preferably not more than 63. When this value is too large, the spin rate on full shots may rise and the distance desired by the average hitter may become unattainable, or the feel at impact may become too hard. On the other hand, when this value is too small, the rebound may become low and the distance desired by the average hitter may become unattainable, or the durability to cracking on repeated impact may worsen.

The hardness $C_{m-6}$ at a position 6 mm inward from a midpoint M between the core center and the core surface, although not particularly limited, may be set to preferably at least 55, more preferably at least 57, and even more preferably at least 59. Although there is no particular upper limit, the hardness $C_{m-6}$ may be set to preferably not more than 70, more preferably not more than 68, and even more preferably not more than 66. Hardnesses that deviate from these values may lead to undesirable results similar to those described above for the core center hardness Cc.

The hardness $C_{m-4}$ at a position 4 mm inward from the midpoint M of the core, although not particularly limited, may be set to preferably at least 57, more preferably at least 59, and even more preferably at least 61. Although there is no particular upper limit, the hardness $C_{m-4}$ may be set to preferably not more than 71, more preferably not more than 69, and even more preferably not more than 67. Hardnesses that deviate from these values may lead to undesirable results similar to those described above for the core center hardness Cc.

The hardness Cm−2 at a position 2 mm inward from the midpoint M of the core, although not particularly limited, may be set to preferably at least 60, more preferably at least 62, and even more preferably at least 64. Although there is no particular upper limit, the hardness Cm−2 may be set to preferably not more than 73, more preferably not more than 71, and even more preferably not more than 69. Hardnesses that deviate from these values may lead to undesirable results similar to those described above for the core center hardness Cc.

The cross-sectional hardness Cm at the midpoint M of the core, although not particularly limited, may be set to preferably at least 64, more preferably at least 66, and even more preferably at least 68. Although there is no particular upper limit, the hardness Cm may be set to preferably not more than 82, more preferably not more than 77, and even more preferably not more than 73. Hardnesses that deviate from these values may lead to undesirable results similar to those described above for the core center hardness Cc.

The core surface hardness Cs is preferably at least 70, more preferably at least 72, and even more preferably at least 74. The upper limit is preferably not more than 90, more preferably not more than 85, and even more preferably not more than 82. When this value is too large, the durability to cracking on repeated impact may worsen or the feel at impact may become too hard. On the other hand, when this value is too small, the rebound may become small or the spin rate on full shots may rise, as a result of which the distance desired by the average hitter may be unattainable.

The hardness Cm+2 at a position 2 mm outward toward the core surface from the midpoint M of the core, although not particularly limited, may be set to preferably at least 67, more preferably at least 69, and even more preferably at least 71. Although there is no particular upper limit, the hardness Cm+2 may be set to preferably not more than 85, more preferably not more than 80, and even more preferably not more than 77. Hardnesses that deviate from these values may lead to undesirable results similar to those described above for the core surface hardness Cs.

The hardness Cm+4 at a position 4 mm outward from the midpoint M of the core, although not particularly limited, may be set to preferably at least 69, more preferably at least 71, and even more preferably at least 73. Although there is no particular upper limit, the hardness Cm+4 may be set to preferably not more than 87, more preferably not more than 82, and even more preferably not more than 79. Hardnesses that deviate from these values may lead to undesirable results similar to those described above for the core surface hardness Cs.

The hardness Cm+6 at a position 6 mm outward toward the core surface from the midpoint M of the core, although not particularly limited, may be set to preferably at least 70, more preferably at least 72, and even more preferably at least 74. Although there is no particular upper limit, the hardness Cm+6 may be set to preferably not more than 89, more preferably not more than 84, and even more preferably not more than 81. Hardnesses that deviate from these values may lead to undesirable results similar to those described above for the core surface hardness Cs.

The value Cs−Cc obtained by subtracting the core center hardness from the core surface hardness is preferably at least 15, more preferably at least 16, and even more preferably at least 17. The upper limit is preferably not more than 30, more preferably not more than 27, and even more preferably not more than 25. When this value is too small, the spin rate on full shots may rise and the distance desired by the average hitter may be unattainable, or the feel at impact may become too hard. On the other hand, when this value is too large, the rebound may decrease and the distance desired by the average hitter may be unattainable, or the durability to cracking on repeated impact may worsen.

In the above-described core hardness profile, the surface areas A to F defined as follows:

| $\frac{1}{2} \times 2 \times (Cm-4-Cm-6)$ | surface area A: |
|---|---|
| $\frac{1}{2} \times 2 \times (Cm-2-Cm-4)$ | surface area B: |
| $\frac{1}{2} \times 2 \times (Cm-Cm-2)$ | surface area C: |
| $\frac{1}{2} \times 2 \times (Cm+2-Cm)$ | surface area D: |
| $\frac{1}{2} \times 2 \times (Cm+4-Cm+2)$ | surface area E: |
| $\frac{1}{2} \times 2 \times (Cm+6-Cm+4)$ | surface area F: | are such as to preferably satisfy the condition surface area B<surface area C<(surface area D+surface area E), and more preferably satisfy the condition surface area A surface area B<surface area C<(surface area D+surface area E).

When these conditions are not satisfied, the spin rate of the ball on full shots may rise and the distance desired by the average hitter may be unattainable.

Figure 2:
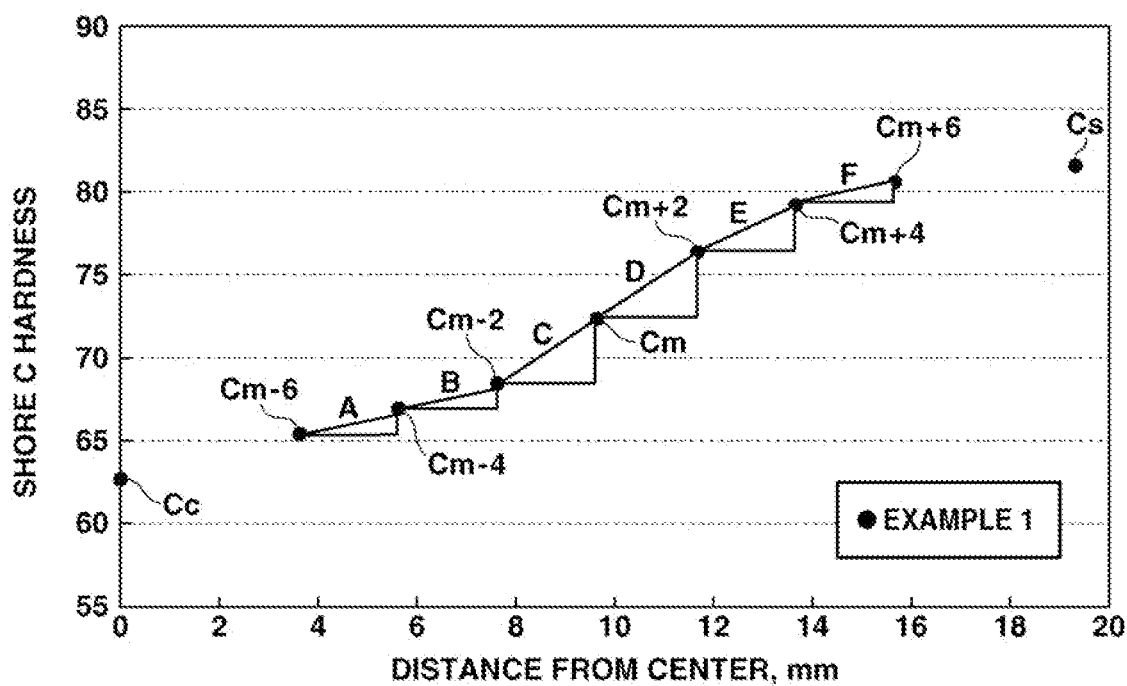
FIG. 2 is a graph that uses core hardness profile data from Example 1 to explain surface areas A to F in a core hardness profile.

FIG. 2 shows a graph that uses core hardness profile data from Example 1 to explain surface areas A to F. As is apparent from the graph, surface areas A to F are each the surface area of a triangle whose base is the difference between specific distances from the core center and whose height is the difference in hardness between the positions at these specific distances.

In this invention, it is critical for the following condition to be satisfied:

{(surface area C+surface area D)−(surface area A+surface area B)}×(Cs−Cc)≥30.

The value of {(surface area C+surface area D)−(surface area A+surface area B)}×(Cs−Cc) must be at least 30, and is preferably at least 35, and more preferably at least 40. The upper limit is preferably not more than 120, more preferably not more than 100, and even more preferably not more than 91. When this value is too small, the spin rate on full shots rises and the distance desired by the average hitter becomes unattainable, or the feel at impact becomes too hard. On the other hand, when this value is too large, the rebound may become lower and so the distance desired by the average hitter may become unattainable, or the durability to cracking on repeated impact may worsen.

Next, the intermediate layer is described.

The intermediate layer has a material hardness on the Shore C hardness scale which, although not particularly limited, is preferably at least 90, more preferably at least 92 and even more preferably at least 93, but is preferably not more than 100, more preferably not more than 98 and even more preferably not more than 96. The material hardness on the Shore D hardness scale is preferably at least 64, more preferably at least 66 and even more preferably at least 68, but is preferably not more than 75, more preferably not more than 72 and even more preferably not more than 70.

The sphere obtained by encasing the core with the intermediate layer (intermediate layer-encased sphere) has a surface hardness which, on the Shore C hardness scale, is preferably at least 95, more preferably at least 96, and even more preferably at least 97. The upper limit is preferably not more than 100, more preferably not more than 99, and even more preferably not more than 98. The surface hardness on the Shore D hardness scale is preferably at least 68, more preferably at least 69, and even more preferably at least 70. The upper limit is preferably not more than 78, more preferably not more than 75, and even more preferably not more than 72.

When the material and surface hardnesses of the intermediate layer are lower than the above ranges, the ball may be too receptive to spin on full shots or the initial velocity on shots may become low, as a result of which the distance on driver (W #1) shots and iron shots by the average hitter may be poor. On the other hand, when the material and surface hardnesses of the intermediate layer are higher than the above ranges, the durability to cracking on repeated impact may worsen or the feel at impact on shots with a putter or on short approaches may become too hard.

The intermediate layer has a thickness which is preferably at least 0.9 mm, more preferably at least 1.0 mm, and even more preferably at least 1.1 mm. The intermediate layer thickness has an upper limit that is preferably not more than 1.5 mm, more preferably not more than 1.4 mm, and even more preferably not more than 1.25 mm. It is preferable for the intermediate layer to be thicker than the subsequently described cover. When the intermediate layer thickness falls outside of the above range or the intermediate layer is thinner than the cover, the ball spin rate-lowering effect on shots with a driver (W #1) may be inadequate, as a result of which the intended distance on full shots by the average hitter may not be achieved. Also, when the intermediate layer is too thin, the durability to cracking on repeated impact may worsen.

The value obtained by subtracting the cover thickness from the intermediate layer thickness is preferably larger than 0 mm, more preferably 0.2 mm or more, and even more preferably 0.4 mm or more. The upper limit is preferably not more than 1.0 mm, more preferably not more than 0.8 mm, and even more preferably not more than 0.6 mm. When this value falls outside of the above range, the spin rate of the ball on full shots may rise or the initial velocity on shots may become low, as a result of which the desired distance by the average hitter may be unattainable. When this value is too small, the durability to cracking on repeated impact may worsen.

It is preferable to use an ionomer resin as the chief material in the intermediate layer material. The ionomer resin material preferably includes a high-acid ionomer resin having an unsaturated carboxylic acid content (also referred to below as the "acid content") of at least 16 wt %.

The amount of high-acid ionomer resin included per 100 wt % of the resin material is preferably at least 20 wt %, more preferably at least 50 wt %, and even more preferably at least 60 wt %. The upper limit is preferably 100 wt % or less, more preferably 90 wt % or less, and even more preferably 85 wt % or less. When the content of this high-acid ionomer resin is too low, the spin rate of the ball on full shots may rise and the distance desired by the average hitter may not be attained. On the other hand, when the content of this high-acid ionomer resin is too high, the durability to repeated impact may worsen.

In cases where an ionomer resin is employed as the chief material, an embodiment that uses in admixture a zinc-neutralized ionomer resin and a sodium-neutralized ionomer resin as the chief material is desirable. The blending ratio therebetween, expressed as the weight ratio of zinc-neutralized ionomer to sodium-neutralized ionomer, is from 5/95 to 95/5, preferably from 10/90 to 90/10, and more preferably from $15/85$ to $85/15$. When the zinc neutralized ionomer and sodium-neutralized ionomer are not included in a ratio within this range, the rebound may become too low and the distance desired by the average hitter may be unattainable, the durability to cracking on repeated impact at normal temperatures may worsen, or the durability to cracking at low temperatures (subzero Centigrade) may worsen.

Depending on the intended use, optional additives may be suitably included in the intermediate layer material. For example, pigments, dispersants, antioxidants, ultraviolet absorbers and light stabilizers may be added. When these additives are included, the amount added per 100 parts by weight of the base resin is preferably at least 0.1 part by weight, and more preferably at least 0.5 part by weight. The upper limit is preferably not more than 10 parts by weight, and more preferably not more than 4 parts by weight.

It is desirable to abrade the surface of the intermediate layer in order to increase adhesion of the intermediate layer material with the polyurethane that is preferably used in the subsequently described cover material. In addition, it is desirable to apply a primer (adhesive) to the surface of the intermediate layer following such abrasion treatment or to add an adhesion reinforcing agent to the intermediate layer material.

Next, the cover is described.

The cover has a material hardness on the Shore C hardness scale which, although not particularly limited, is preferably at least 50, more preferably at least 57 and even more preferably at least 63, but is preferably not more than 86, more preferably not more than 74 and even more preferably not more than 71. The material hardness on the Shore D hardness scale is preferably at least 30, more preferably at least 35 and even more preferably at least 40, but is preferably not more than 57, more preferably not more than 53 and even more preferably not more than 50.

The sphere obtained by encasing the intermediate layer-encased sphere with the cover—that is, the ball—has a surface hardness which, on the Shore C hardness scale, is preferably at least 73, more preferably at least 78 and even more preferably at least 83, but is preferably not more than 95, more preferably not more than 92 and even more preferably not more than 90. The surface hardness on the Shore D hardness scale is preferably at least 50, more preferably at least 53 and even more preferably at least 56, but is preferably not more than 70, more preferably not more than 65 and even more preferably not more than 60.

When the material hardness and surface hardness of the cover are lower than the above respective ranges, the spin rate of the ball on full shots may rise and a good distance on driver (W #1) shots and iron shots by the average hitter may not be achieved. On the other hand, when the material hardness and surface hardness of the cover are too high, the ball may not be receptive to spin on approach shots or the scuff resistance may worsen.

The cover has a thickness of preferably at least 0.3 mm, more preferably at least 0.5 mm, and even more preferably at least 0.6 mm. The upper limit in the cover thickness is preferably not more than 1.2 mm, more preferably not more than 0.9 mm, and even more preferably not more than 0.8 mm. When the cover is too thick, the rebound of the ball on full shots may be inadequate or the spin rate may rise, as a result of which a good distance on driver (W #1) shots and iron shots by the average hitter may not be achieved. On the other hand, when the cover is too thin, the scuff resistance may worsen or the ball may not be receptive to spin on approach shots and may thus lack sufficient controllability.

Various urethane resins employed as cover stock in golf balls may be used as the cover material. For reasons having to do with the spin controllability of the ball in the short game and the scuff resistance, and also from the standpoint of mass productivity, the use of a resin material composed primarily of a thermoplastic urethane is preferred. That is, the cover is preferably formed of a resin blend in which the main components are (I) a thermoplastic polyurethane and (II) a polyisocyanate compound.

It is recommended that the combined weight of components I and II be at least 60%, and preferably at least 70%, of the overall amount of the cover-forming resin composition. Components I and II are described in detail below.

The thermoplastic polyurethane (I) has a structure which includes soft segments composed of a polymeric polyol (polymeric glycol) that is a long-chain polyol and hard segments composed of a chain extender and a polyisocyanate compound. Here, the long chain polyol serving as a starting material may be any that has hitherto been used in the art relating to thermoplastic polyurethanes, and is not particularly limited. Illustrative examples include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. These long-chain polyols may be used singly, or two or more may be used in combination. Of these, in terms of being able to synthesize a thermoplastic polyurethane having a high rebound resilience and excellent low-temperature properties, a polyether polyol is preferred.

Any chain extender that has hitherto been employed in the art relating to thermoplastic polyurethanes may be suitably used as the chain extender. For example, low-molecular-weight compounds with a molecular weight of 400 or less which have on the molecule two or more active hydrogen atoms capable of reacting with isocyanate groups are preferred. Illustrative, non-limiting, examples of the chain extender include 1,4-butylene glycol, 1,2-ethylene glycol, 1,3-butanediol, 1,6-hexanediol and 2,2-dimethyl-1,3-propanediol. Of these, the chain extender is preferably an aliphatic diol having from 2 to 12 carbon atoms, and is more preferably 1,4-butylene glycol.

Any polyisocyanate compound hitherto employed in the art relating to thermoplastic polyurethanes may be suitably used without particular limitation as the polyisocyanate compound. For example, use may be made of one or more selected from the group consisting of 4,4'-diphenylmethane diisocyanate, 2,4-toluene diisocyanate, 2,6 toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. However, depending on the type of isocyanate, the crosslinking reactions during injection molding may be difficult to control. In the practice of the invention, to provide a balance between stability at the time of production and the properties that are manifested, it is most preferable to use the following aromatic diisocyanate: 4,4' diphenylmethane diisocyanate.

A commercial product may be used as the thermoplastic polyurethane serving as component I. Illustrative examples include Pandex T-8295, Pandex T-8290 and Pandex T 8260 (all from DIC Covestro Polymer, Ltd.).

A thermoplastic elastomer other than the above thermoplastic polyurethanes may also be optionally included as a separate component, i.e., component III, together with above components I and II. By including this component III in the above resin blend, the flowability of the resin blend can be further improved and properties required of the golf ball cover material, such as resilience and scuff resistance, can be enhanced.

The compositional ratio of above components I, II and III is not particularly limited. However, to fully elicit the advantageous effects of the invention, the compositional ratio I:II:III is preferably in a weight ratio range of from 100:2:50 to 100:50:0, and more preferably in a range of from 100:2:50 to 100:30:8.

In addition, various additives other than the ingredients making up the above thermoplastic polyurethane may be optionally included in this resin blend. For example, pigments, dispersants, antioxidants, light stabilizers, ultraviolet absorbers and internal mold lubricants may be suitably included.

The manufacture of multi-piece solid golf balls in which the above-described core, intermediate layer and cover (outermost layer) are formed as successive layers may be carried out by a customary method such as a known injection molding process. For example, a multi-piece golf ball can be produced by injection-molding the intermediate layer material over the core in an injection mold so as to obtain an intermediate layer-encased sphere and then, last of all, injection-molding the material for the cover serving as the outermost layer over the intermediate layer-encased sphere. Alternatively, the respective encasing layers (i.e., the intermediate layer and the cover) may be formed by, for each layer, furnishing two half-cups that have been molded into hemispherical shapes, enclosing the core or the intermediate layer-enclosed sphere within the half-cups and then molding under applied heat and pressure.

The golf ball has a deflection when compressed under a final load of 1,275 N (130 kgf) from an initial load of 98 N (10 kgf) which is preferably at least 2.2 mm, more preferably at least 2.3 mm, and even more preferably at least 2.4 mm. The deflection upper limit is preferably not more than 3.1 mm, more preferably not more than 3.0 mm, and even more preferably not more than 2.9 mm. When the golf ball deflection is too small, i.e., when the ball is too hard, the spin rate may rise excessively and the distance on driver (W #1) shots and iron shots by the average hitter may be poor, or the feel at impact may be too hard. On the other hand, when the deflection is too large, i.e., when the ball is too soft, the spin rate on shots with an iron may become low and the run may become too long, making the desired distance control difficult to achieve, the feel at impact may be too soft, or the durability to cracking on repeated impact may worsen.

The sphere obtained by encasing the intermediate layer-encased sphere with the cover—that is, the ball—has an initial velocity which is preferably at least 71.0 m/s, more preferably at least 72.0 m/s, and even more preferably at least 73.0 m/s. The upper limit is not more than 75.0 m/s, preferably not more than 74.5 m/s, and more preferably not more than 74.0 m/s. When this initial velocity is too high, the degree of drop-off in the distance relative to current tour balls on driver shots by a long hitter is inadequate and there may be a risk of the ball traveling farther than the standard distance in the new distance rule anticipated by The R&A and the USGA. On the other hand, when this initial velocity is too low, the distance of the ball on driver (W #1) shots and iron shots by the average hitter may end up being shorter than the distance desired by players at this level. The initial velocity in this case is a value measured with a COR initial velocity tester custom-designed and built by Hye Precision Products according to R&A protocols. At the time of measurement, the air pressure is changed in four stages and measurement is carried out, based on which a formula relating the inbound velocity and the COR is established and the initial velocity at an inbound velocity of 43.83 m/s is determined. Measurement with this COR initial velocity test is carried out at a room temperature of 23.9±2° C. using a ball that has been held isothermally for at least 3 hours in a thermostatic chamber adjusted to 23.9±1° C.

Relationship Among Surface Hardnesses of the Spheres

For the golf ball of the invention to have both a superior distance on full shots by the average hitter and controllability in the short game, it is critical for the relationship between the surface hardness of the intermediate layer-encased sphere and the surface hardness of the ball to satisfy the following condition:

(surface hardness of ball)<(surface hardness of intermediate layer-encased sphere).

The value obtained by subtracting the surface hardness of the ball from the surface hardness of the intermediate layer-encased sphere, expressed on the Shore C hardness scale, is preferably 2 or more, more preferably 5 or more, and even more preferably 8 or more. The upper limit is preferably not more than 18, more preferably not more than 15, and even more preferably not more than 12. When this value is too small, the controllability in the short game may worsen. On the other hand, when this value is too large, the spin rate on full shots may rise and the distance desired by the average hitter may be unattainable.

The value obtained by subtracting the surface hardness of the core from the surface hardness of the intermediate layer-encased sphere, expressed on the Shore C hardness scale, is preferably 5 or more, more preferably 10 or more, and even more preferably 15 or more. The upper limit is preferably not more than 28, more preferably not more than 25, and even more preferably not more than 22. When this value falls outside of the above range, the spin rate of the ball on full shots may rise and the distance desired by the average hitter may be unattainable.

The value obtained by subtracting the center hardness of the core from the surface hardness of the intermediate layer-encased sphere, expressed on the Shore C hardness scale, is preferably 27 or more, more preferably 30 or more, and even more preferably 33 or more. The upper limit is preferably not more than 53, more preferably not more than 48, and even more preferably not more than 40. When this value is too small, the spin rate of the ball on full shots may rise and the distance desired by the average hitter may be unattainable. On the other hand, when this value is too large, the durability of the ball to cracking on repeated impact may worsen or the initial velocity on shots may be low, as a result of which the distance desired by the average hitter may be unattainable.

Core Diameter and Ball Diameter

The relationship between the core diameter and the ball diameter, i.e., the value expressed as (core diameter)/(ball diameter), is preferably 0.859 or more, more preferably 0.883 or more, and even more preferably 0.895 or more. The upper limit is preferably not more than 0.939, more preferably not more than 0.925, and even more preferably not more than 0.913. When this value is too small, the ball initial velocity may become low or the deflection of the overall ball may become small and the ball may become harder; also, the spin rate of the ball on full shots may rise, as a result of which the distance desired by the average hitter may be unattainable. On the other hand, when this value is too large, the spin rate on full shots may rise, making the distance desired by the average hitter unattainable, or the durability to cracking on repeated impact may worsen.

Deflection Relationships Among Spheres

Letting C and B be the respective deflections in millimeters of the core and the ball when compressed under an initial load of 1,275 N (130 kgf) from an initial load of 98 N (10 kgf), the value of C−B is preferably 0.46 mm or more, more preferably 0.48 mm or more, and even more preferably 0.50 mm or more. The upper limit is preferably not more than 0.85 mm, more preferably not more than 0.75 mm, and even more preferably not more than 0.65 mm. When this value is too large, the durability to cracking under repeated impact may worsen, or the initial velocity on shots may become low, as a result of which the distance desired by the average hitter may be unattainable. On the other hand, when this value is too small, the feel at impact may become too hard or the spin rate on full shots may rise, as a result of which the distance desired by the average hitter may be unattainable.

Letting C and M be the respective deflections in millimeters of the core and the intermediate layer-encased sphere when compressed under an initial load of 1,275 N (130 kgf) from an initial load of 98 N (10 kgf), the value of C−M is preferably 0.25 mm or more, more preferably 0.3 mm or more, and even more preferably 0.35 mm or more. The upper limit is preferably not more than 0.65 mm, more preferably not more than 0.55 mm, and even more preferably not more than 0.5 mm. When this value is too large, the durability to cracking under repeated impact may worsen, or the initial velocity on shots may become low, as a result of which the distance desired by the average hitter may be unattainable. On the other hand, when this value is too small, the feel at impact may become too hard or the spin rate on full shots may rise, as a result of which the distance desired by the average hitter may be unattainable.

Numerous dimples may be formed on the outside surface of the cover. The number of dimples arranged on the cover surface, although not particularly limited, is preferably at least 250, more preferably at least 300, and even more preferably at least 320. The upper limit is preferably not more than 380, more preferably not more than 350, and even more preferably not more than 340. When the number of dimples is higher than this range, the ball trajectory may become lower and the distance traveled by the ball may decrease. On the other hand, when the number of dimples is lower that this range, the ball trajectory may become higher and a good distance may not be achieved.

The dimple shapes used may be of one type or may be a combination of two or more types suitably selected from among, for example, circular shapes, various polygonal shapes, dewdrop shapes and oval shapes. When circular dimples are used, the dimple diameter may be set to at least about 2.5 mm and up to about 6.5 mm, and the dimple depth may be set to at least 0.08 mm and up to 0.30 mm.

In order for the aerodynamic properties to be fully manifested, it is desirable for the dimple coverage ratio on the spherical surface of the golf ball, i.e., the dimple surface coverage SR, which is the sum of the individual dimple surface areas, each defined by the flat plane circumscribed by the edge of a dimple, as a percentage of the spherical surface area of the ball were the ball to have no dimples thereon, to be set to at least 70% and not more than 90%. Also, to optimize the ball trajectory, it is desirable for the value $V_0$, defined as the spatial volume of the individual dimples below the flat plane circumscribed by the dimple edge, divided by the volume of the cylinder whose base is the flat plane and whose height is the maximum depth of the dimple from the base, to be set to at least 0.35 and not more than 0.80. Moreover, it is preferable for the ratio VR of the sum of the volumes of the individual dimples, each formed below the flat plane circumscribed by the edge of the dimple, with respect to the volume of the ball sphere were the ball surface to have no dimples thereon, to be set to at least 0.6% and not more than 1.0%. Outside of the above ranges in these respective values, the resulting trajectory may not enable a good distance to be achieved and so the ball may not travel a satisfactory distance.

The multi-piece solid golf ball of the invention can be made to conform to the Rules of Golf for play. The inventive ball may be formed to a diameter which is such that the ball does not pass through a ring having an inner diameter of 42.672 mm and to a weight which is preferably between 45.0 and 45.93 g.

EXAMPLES

The following Examples and Comparative Examples are provided to illustrate the invention, and are not intended to limit the scope thereof.

Examples 1 to 3, Comparative Examples 1 to 4

Formation of Core

Solid cores were produced by preparing rubber compositions for the respective examples shown in Table 1, and then molding and vulcanizing the compositions under the vulcanization conditions for each example shown in Table 1.

TABLE 1

| | | Example | | | Comparative Example | | | |
|---|---|---|---|---|---|---|---|---|
| | | 1 | 2 | 3 | 1 | 2 | 3 | 4 |
| Core formulation (pbw) | Polybutadiene | 35 | 35 | 35 | 29 | 29 | 100 | 95 |
| | Isoprene rubber | | | | | | | 5 |
| | Styrene-butadiene rubber | 65 | 65 | 65 | 71 | 71 | | |
| | Zinc acrylate | 26.9 | 24.9 | 22.9 | 28.1 | 24.1 | 37.0 | |
| | Zinc methacrylate | 1.0 | 1.0 | 1.0 | | | 1.0 | |
| | Methacrylic acid | | | | | | | 23.5 |
| | Organic Peroxide A | 1.0 | 1.0 | 1.0 | 0.6 | 0.6 | 1.0 | 1.2 |
| | Organic Peroxide B | | | | 0.6 | 0.6 | | |
| | Water | 0.4 | 0.4 | 0.4 | | | 0.4 | |
| | Antioxidant | 0.1 | 0.1 | 0.1 | 0.2 | 0.2 | 0.1 | 0.2 |
| | Zinc oxide | 16.5 | 17.3 | 18.1 | 16.2 | 17.9 | 14.8 | 23.5 |
| | Barium sulfate | | | | | | | 1.0 |
| | Zinc salt of pentachlorothiophenol | | | | | | 1.0 | |
| Vulcanization conditions | Temperature (° C.) | 150 | 150 | 150 | 158 | 158 | 150 | 163 |
| | Time (minutes) | 19 | 19 | 19 | 15 | 15 | 19 | 21 |

Details on the above ingredients are provided below.

Polybutadiene: Available under the trade name "BR01" from JSR Corporation

Isoprene rubber: Available under the trade name "IR2200" from JSR Corporation

Styrene-butadiene rubber: Available under the trade name "SBR1507" from JSR Corporation Zinc acrylate: Available under the trade name "ZNDA85S" from Nippon Shokubai Co., Ltd.

Zinc methacrylate: Available under the trade name "ZDA-90" from Asada Chemical Industry Co., Ltd.

Organic Peroxide A: Dicumyl peroxide, available under the trade name "Percumyl D" from NOF Corporation Organic Peroxide B: A mixture of 1,1-di(t-butylperoxy)cyclohexane and silica, available under the trade name "Perhexa C-40" from NOF Corporation Water: Pure water from Seiki Chemical Industrial Co., Ltd.

Antioxidant: 2,2'-Methylenebis(4-methyl-6-butylphenol), available under the trade name "Nocrac NS-6" from Ouchi Shinko Chemical Industry Co., Ltd.

Zinc oxide: Available as Grade 3 Zinc Oxide from Sakai Chemical Co., Ltd.

Zinc salt of pentachlorothiophenol: Available from Wako Pure Chemical Industries, Ltd.

Formation of Intermediate Layer and Cover (Outermost Layer)

Next, an intermediate layer was formed by using an injection mold to injection-mold Resin Material No. 1 shown in Table 2 over the core surface. A cover (outermost layer) was then formed by using a different injection mold to injection-mold Resin Material No. 2 or No. 3 shown in Table 2 over the intermediate layer-encased sphere. Numerous dimples of a given configuration common to all of the Examples and Comparative Examples were formed at this time on the cover surface.

TABLE 2

| Resin formulation (pbw) | Acid content (wt %) | Metal species | No. 1 | No. 2 | No. 3 |
|---|---|---|---|---|---|
| Himilan 1706 | 15 | Zn | 15 | | |
| AM 7318 | 18 | Na | 85 | | |
| Titanium oxide | | | | 3 | 3 |
| Trimethylolpropane | | | 1.1 | | |

TABLE 2-continued

| Resin formulation (pbw) | Acid content (wt %) | Metal species | No. 1 | No. 2 | No. 3 |
|---|---|---|---|---|---|
| TPU (1) | | | | 100 | |
| TPU (2) | | | | | 100 |

Trade names and other details on the compounding ingredients in Table 2 are given below.

Himilan® 1706, AM 7318: Ionomers available from Dow-Mitsui Polychemicals Co., Ltd.

Trimethylolpropane (TMP): Available from Tokyo Chemical Industry Co., Ltd.

TPU (1): An ether-type thermoplastic polyurethane available under the trade name "Pandex" from DIC Covestro Polymer, Ltd.; material hardness (Shore D), 50

TPU (2): An ether-type thermoplastic polyurethane available under the trade name "Pandex" from DIC Covestro Polymer, Ltd.; material hardness (Shore D), 47

Various properties of the resulting golf balls, including the internal hardnesses of the core at various positions, the diameters of the core and each layer-encased sphere, the thickness and material hardness of each layer, the surface hardness of each layer-encased sphere and the initial velocity of the ball, are evaluated by the following methods. The results are presented in Tables 3 and 4.

Core Hardness Profile

The indenter of a durometer is set substantially perpendicular to the spherical surface of the core and the surface hardness on the Shore C hardness scale is measured in accordance with ASTM D2240. The hardnesses at the center and specific positions of the core are measured as Shore C hardness values by perpendicularly pressing the indenter of a durometer against the center portion and the specific positions shown in Table 3 on the flat cross-section obtained by cutting the core into hemispheres. The P2 Automatic Rubber Hardness Tester (Kobunshi Keiki Co., Ltd.) equipped with a Shore C durometer can be used for measuring the hardness. The maximum value is read off as the hardness value. Measurements are all carried out in a 23±2° C. environment. The numbers in the table are Shore C hardness values.

Also, in the core hardness profile, letting Cc be the Shore C hardness at the center of the core, Cs be the Shore C hardness at the core surface, Cm be the Shore C hardness at the midpoint M between the core center and core surface, Cm−2, Cm−4 and Cm−6 be the respective Shore C hardnesses at positions 2 mm, 4 mm and 6 mm inward from the midpoint M and Cm+2, Cm+4 and Cm+6 be the respective Shore C hardnesses at positions 2 mm, 4 mm and 6 mm outward from the midpoint M, the surface areas A to F defined as follows

| | |
|---|---|
| ½×2×(Cm−4−Cm−6) | surface area A: |
| ½×2×(Cm−2−Cm−4) | surface area B: |
| ½×2×(Cm−Cm−2) | surface area C: |
| ½×2×(Cm+2−Cm) | surface area D: |
| ½×2×(Cm+4−Cm+2) | surface area E: |
| ½×2×(Cm+6−Cm+4) | surface area F: | are calculated, and the values of the following five expressions are determined.

surface area A+surface area B  (1)

surface area C+surface area D  (2)

surface areas D+surface area E  (3)

(surface area C+surface area D)−(surface area A+surface area B)  (4)

{(surface area C+surface area D)−(surface area A+surface area B)}×(Cs−Cc)  (5)

Surface areas A to F in the core hardness profile are explained in FIG. 2, which is a graph plotted using the core hardness profile data from Example 1.

FIGS. 3 and 4 show graphs of the core hardness profiles for Examples 1 to 3 and

Comparative Examples 1 to 4

Diameters of Core and Intermediate Layer-Encased Sphere

The spheres to be measured are held isothermally for at least 3 hours in a thermostatic chamber adjusted to 23.9±1° C., following which they are measured in a 23.9±2° C. room. The diameters at five random places on the surface of each sphere are measured. Using the average of these measurements as the measured value for a single sphere, the average diameter for ten such spheres is determined.

Ball Diameter

The balls to be measured are held isothermally for at least 3 hours in a thermostatic chamber adjusted to 23.9±1° C., following which they are measured in a 23.9±2° C. room. The diameters at 15 random dimple-free areas on each ball are measured. Using the average of these measurements as the measured value for a single ball, the average diameter for ten balls is determined.

Deflections of Core, Intermediate Layer-Encased Sphere and Ball

The core, intermediate layer-encased sphere or ball is placed on a hard plate and the amount of deflection when compressed under a final load of 1,275 N (130 kgf) from an initial load of 98 N (10 kgf) is measured. The amount of deflection is the measured value obtained by measurement in a 23.9±2° C. room after holding the sphere isothermally for at least 3 hours in a thermostatic chamber adjusted to 23.9±1° C. The instrument used is a high-load compression tester available from MU Instruments Trading Corp. The rate at which pressure is applied by the head which compresses the core, the layer-encased sphere or the ball is set to 10 mm/s.

Material Hardnesses (Shore C and Shore D Hardnesses) of Intermediate Layer and Cover The resin material for each layer is molded into a sheet having a thickness of 2 mm and left to stand at a temperature of 23±2° C. for two weeks. At the time of measurement, three sheets are stacked together. The Shore C hardness and Shore D hardness of each material are measured with Shore C and Shore D durometers that conform to ASTM D2240. A P2 Automatic Rubber Hardness Tester (Kobunshi Keiki Co., Ltd.) having mounted thereon a Shore C durometer or a Shore D durometer can be used for measuring the hardnesses. The maximum value is read off as the hardness value. The measurement method conforms with ASTM D2240.

Surface Hardnesses of Intermediate Layer-Encased Sphere and Ball

These hardnesses are measured by perpendicularly pressing an indenter against the surfaces of the respective spheres. The surface hardness of a ball (cover) is the value measured at a dimple-free area (land) on the surface of the ball. The Shore C hardness and Shore D hardness at the surface of each sphere are measured with Shore C and Shore D durometers that conform to ASTM D2240. A P2 Automatic Rubber Hardness Tester (Kobunshi Keiki Co., Ltd.) having mounted thereon a Shore C durometer or a Shore D durometer can be used for measuring the hardnesses. The maximum value is read off as the hardness value. The measurement method conforms with ASTM D2240.

Initial Velocity of Ball

The initial velocity of the ball is measured as follows using a COR initial velocity tester that was custom-designed and built by Hye Precision Products according to R&A protocols. The air pressure is changed in four stages—35.5, 36.5, 39.5 and 40.5 psi—and the ball is fired at four inbound velocities by means of the respective air pressures and made to collide with a barrier, and the coefficient of restitution (COR) is measured. That is, the relationship between the inbound velocity and the COR is established by changing the air pressure in four stages. A correlation formula between the inbound velocity and the contact time is similarly established.

From these correlation formulas, the COR and the contact time (μs) at an inbound velocity of 43.83 m/s are determined and inserted into the following initial velocity conversion formula to compute the initial velocities of the ball.

$$IV = 136.8 + 136.3e + 0.019tc$$

Here, e is the coefficient of restitution and tc is the contact time (μs) at an impact velocity of 143.8 ft/s (43.83 m/s).

TABLE 3

|  |  | Example | | | Comparative Example | | | |
|---|---|---|---|---|---|---|---|---|
|  |  | 1 | 2 | 3 | 1 | 2 | 3 | 4 |
| Core | Diameter (mm) | 38.64 | 38.64 | 38.66 | 38.66 | 38.65 | 38.65 | 39.80 |
|  | Weight (g) | 35.1 | 35.1 | 35.1 | 35.1 | 35.1 | 35.1 | 37.0 |
|  | Deflection (mm) | 2.93 | 3.28 | 3.68 | 2.68 | 3.36 | 2.92 | 2.63 |
|  | Cs (Shore C) | 81.5 | 77.2 | 74.8 | 81.7 | 76.8 | 87.4 | 84.3 |
|  | Cm + 6 (Shore C) | 80.5 | 77.1 | 74.1 | 80.5 | 74.8 | 80.4 | 79.0 |
|  | Cm + 4 (Shore C) | 79.0 | 75.9 | 73.0 | 79.4 | 74.2 | 75.8 | 75.9 |
|  | Cm + 2 (Shore C) | 76.2 | 73.6 | 71.0 | 77.2 | 73.2 | 70.8 | 72.8 |
|  | Cm (Shore C) | 72.3 | 70.2 | 68.0 | 74.1 | 71.2 | 66.3 | 70.8 |
|  | Cm − 2 (Shore C) | 68.4 | 66.2 | 64.1 | 72.5 | 68.9 | 65.6 | 69.8 |
|  | Cm − 4 (Shore C) | 66.9 | 63.8 | 61.4 | 71.3 | 67.2 | 64.9 | 68.4 |
|  | Cm − 6 (Shore C) | 65.4 | 62.1 | 59.7 | 69.8 | 65.4 | 63.3 | 66.3 |
|  | Cc (Shore C) | 62.7 | 61.0 | 58.2 | 68.6 | 62.9 | 62.6 | 60.7 |
|  | Cs − Cc (Shore C) | 18.8 | 16.2 | 16.6 | 13.1 | 13.9 | 24.8 | 23.6 |
|  | (Cs − Cc)/(Cm − Cc) | 2.0 | 1.8 | 1.7 | 2.4 | 1.7 | 6.7 | 2.3 |
|  | Surface area A: ½ × 2 × (Cm − 4 − Cm − 6) | 1.5 | 1.7 | 1.7 | 1.5 | 1.8 | 1.6 | 2.1 |
|  | Surface area B: ½ × 2 × (Cm − 2 − Cm − 4) | 1.5 | 2.4 | 2.7 | 1.2 | 1.7 | 0.7 | 1.4 |
|  | Surface area C: ½ × 2 × (Cm − Cm − 2) | 3.9 | 4.0 | 3.9 | 1.6 | 2.3 | 0.7 | 1.0 |
|  | Surface area D: ½ × 2 × (Cm + 2 − Cm) | 3.9 | 3.4 | 3.0 | 3.1 | 2.0 | 4.5 | 2.0 |
|  | Surface area E: ½ × 2 × (Cm + 4 − Cm + 2) | 2.8 | 2.3 | 2.0 | 2.2 | 1.0 | 5.0 | 3.1 |
|  | Surface area F: ½ × 2 × (Cm + 6 − Cm + 4) | 1.5 | 1.2 | 1.1 | 1.1 | 0.6 | 4.6 | 3.1 |
|  | Surface area A + Surface area B | 3.0 | 4.1 | 4.4 | 2.7 | 3.5 | 2.3 | 3.5 |
|  | Surface area C + Surface area D | 7.8 | 7.4 | 6.9 | 4.7 | 4.3 | 5.2 | 3.0 |
|  | Surface area D + Surface area E | 6.7 | 5.7 | 5.0 | 5.3 | 3.0 | 9.5 | 5.1 |
|  | (Surface areas C + D) − (Surface areas A + B) | 4.8 | 3.3 | 2.5 | 2.0 | 0.8 | 2.9 | −0.5 |
|  | {(Surface areas C + D) − (Surface areas A + B)} × (Cs − Cc) | 90.2 | 53.5 | 41.5 | 26.2 | 11.1 | 71.9 | −11.8 |

TABLE 4

|  |  | Example | | | Comparative Example | | | |
|---|---|---|---|---|---|---|---|---|
|  |  | 1 | 2 | 3 | 1 | 2 | 3 | 4 |
| Construction (piece) |  | 3P | 3P | 3P | 3P | 3P | 3P | 2P |
| Intermediate layer | Material | No. 1 | No. 1 | No. 1 | No. 1 | No. 1 | No. 1 | — |
|  | Thickness (mm) | 1.21 | 1.21 | 1.19 | 1.19 | 1.19 | 1.17 | — |
|  | Material hardness (Shore C) | 94 | 94 | 94 | 94 | 94 | 94 | — |
|  | Material hardness (Shore D) | 67 | 67 | 67 | 67 | 67 | 67 | — |
| Intermediate layer-encased sphere | Diameter (mm) | 41.06 | 41.06 | 41.05 | 41.04 | 41.04 | 40.99 | — |
|  | Weight (g) | 40.8 | 40.8 | 40.7 | 40.7 | 40.7 | 40.6 | — |
|  | Deflection (mm) | 2.56 | 2.83 | 3.08 | 2.42 | 2.90 | 2.45 | — |
|  | Surface hardness (Shore C) | 97 | 97 | 97 | 97 | 97 | 97 | — |
|  | Surface hardness (Shore D) | 71 | 71 | 71 | 71 | 71 | 71 | — |
| Intermediate layer surface hardness − Core surface hardness (Shore C) |  | 16 | 20 | 22 | 15 | 20 | 10 | — |
| Intermediate layer surface hardness − Core center hardness (Shore C) |  | 34 | 36 | 39 | 28 | 34 | 34 | — |
| Core deflection − Intermediate layer-encased sphere deflection |  | 0.37 | 0.45 | 0.60 | 0.26 | 0.46 | 0.47 | — |
| Cover | Material | No. 2 | No. 2 | No. 2 | No. 2 | No. 2 | No. 2 | No. 3 |
|  | Thickness (mm) | 0.81 | 0.81 | 0.82 | 0.83 | 0.83 | 0.85 | 1.46 |
|  | Material hardness (Shore C) | 71 | 71 | 71 | 71 | 71 | 71 | 67 |
|  | Material hardness (Shore D) | 50 | 50 | 50 | 50 | 50 | 50 | 47 |
| Ball | Diameter (mm) | 42.69 | 42.68 | 42.68 | 42.71 | 42.70 | 42.69 | 42.72 |
|  | Weight (g) | 45.46 | 45.43 | 45.43 | 45.46 | 45.41 | 45.48 | 45.66 |
|  | Deflection (mm) | 2.41 | 2.6 | 2.94 | 2.27 | 2.75 | 2.36 | 2.51 |
|  | Initial velocity (m/s) | 73.1 | 73.0 | 73.0 | 72.9 | 72.9 | 77.2 | 73.4 |
|  | Surface hardness (Shore C) | 86 | 86 | 86 | 86 | 86 | 86 | 79 |
|  | Surface hardness (Shore D) | 58 | 58 | 58 | 58 | 58 | 58 | 53 |

TABLE 4-continued

|  | Example | | | Comparative Example | | | |
| --- | --- | --- | --- | --- | --- | --- | --- |
|  | 1 | 2 | 3 | 1 | 2 | 3 | 4 |
| Intermediate layer surface hardness − Ball surface hardness (Shore C) | 11 | 11 | 11 | 11 | 11 | 11 | — |
| Core deflection − Ball deflection (mm) | 0.52 | 0.64 | 0.74 | 0.41 | 0.61 | 0.56 | 0.12 |
| Core diameter/Ball diameter | 0.905 | 0.905 | 0.906 | 0.905 | 0.905 | 0.905 | 0.932 |
| Intermediate layer thickness − Cover thickness (mm) | 0.40 | 0.40 | 0.38 | 0.36 | 0.36 | 0.32 | — |

The flight (W #1, I #6) and controllability on approach shots of each golf ball are evaluated by the following methods. The results are shown in Table 5.

Evaluation of Flight (W #1, Head Speed of 50 m/s)

A driver is mounted on a golf swing robot and the spin rate and total distance traveled by the ball when struck at a head speed (HS) of 50 m/s are measured. The club used is the TourB XD-5 driver (2017 model; loft angle, 9.5°) manufactured by Bridgestone Sports Co., Ltd. Evaluation is carried out based on the following criteria.

Rating Criteria
  Good: Total distance is at least 12.0 m shorter than in Comparative Example 3
  NG: Total distance is less than 12.0 m shorter than in Comparative Example 3

Evaluation of Flight (W #1, head speed of 40 m/s) A driver is mounted on a golf swing robot and the spin rate and total distance traveled by the ball when struck at a head speed of 40 m/s are measured. The club used is the JGR Driver (2016 model; loft angle, 9.5°) manufactured by Bridgestone Sports Co., Ltd. Evaluation is carried out based on the following criteria.

Rating Criteria
  Good: Total distance is up to 11.0 m shorter than in Comparative Example 3
  Fair: Total distance is more than 11.0 m shorter and up to 12.0 m shorter than in Comparative Example 3
  NG: Total distance is more than 12.0 m shorter than in Comparative Example 3

Evaluation of Flight (W #1, Head Speed of 35 m/s)

A driver is mounted on a golf swing robot and the spin rate and total distance traveled by the ball when struck at a head speed of 35 m/s are measured. The club used is the JGR Driver (2016 model; loft angle, 9.5°) manufactured by Bridgestone Sports Co., Ltd. Evaluation is carried out based on the following criteria.

Rating Criteria
  Good: Total distance is up to 11.0 m shorter than in Comparative Example 3
  Fair: Total distance is more than 11.0 m shorter and up to 12.0 m shorter than in Comparative Example 3
  NG: Total distance is more than 12.0 m shorter than in Comparative Example 3

Evaluation of Flight (I #6, Head Speed of 38 m/s)

A number six iron is mounted on a golf swing robot and the spin rate and total distance traveled by the ball when struck at a head speed of 38 m/s are measured. The club used is the JGR Forged I #6 (2016 model) manufactured by Bridgestone Sports Co., Ltd. Evaluation is carried out based on the following criteria.

Rating Criteria
  Good: Total distance is up to 11.0 m shorter than in Comparative Example 3
  Fair: Total distance is more than 11.0 m shorter and up to 12.0 m shorter than in Comparative Example 3
  NG: Total distance is more than 12.0 m shorter than in Comparative Example 3

Evaluation of Flight (I #6, Head Speed of 34 m/s)

A number six iron is mounted on a golf swing robot and the spin rate and total distance traveled by the ball when struck at a head speed of 34 m/s are measured. The club used is the JGR Forged I #6 (2016 model) manufactured by Bridgestone Sports Co., Ltd. Evaluation is carried out based on the following criteria.

Rating Criteria
  Good: Total distance is up to 11.0 m shorter than in Comparative Example 3
  Fair: Total distance is more than 11.0 m shorter and up to 12.0 m shorter than in Comparative Example 3
  NG: Total distance is more than 12.0 m shorter than in Comparative Example 3

Evaluation of Spin Rate on Approach Shots

A sand wedge is mounted on a golf swing robot and the amount of spin by the ball when struck at a head speed of 15 m/s is rated according to the criteria shown below. The spin rate is measured with a launch monitor immediately after the ball has been struck. The sand wedge used is the TourStage TW-03 (loft angle, 57°; 2002 model) manufactured by Bridgestone Sports Co., Ltd.

Rating Criteria:
  Good: Spin rate is 4,500 rpm or more
  NG: Spin rate is less than 4,500 rpm

TABLE 5

|  |  |  | Example | | | Comparative Example | | | |
| --- | --- | --- | --- | --- | --- | --- | --- | --- | --- |
|  |  |  | 1 | 2 | 3 | 1 | 2 | 3 | 4 |
| Flight | W#1 HS, 50 m/s | Spin rate (rpm) | 2,957 | 2,912 | 2,840 | 3,052 | 2,939 | 2,651 | 3,161 |
|  |  | Total distance (m) | 248.3 | 248.6 | 249.5 | 249.6 | 247.3 | 261.8 | 241.8 |
|  |  | Total distance relative to Comparative Example 3 (m) | −13.5 | −13.2 | −12.3 | −12.2 | −14.5 | 0.0 | −20.0 |
|  |  | Rating | good | good | good | good | good | NG | good |

TABLE 5-continued

|  |  |  | Example | | | Comparative Example | | | |
|---|---|---|---|---|---|---|---|---|---|
|  |  |  | 1 | 2 | 3 | 1 | 2 | 3 | 4 |
|  | W#1 | Spin rate (rpm) | 3,239 | 3,197 | 3,060 | 3,353 | 3,147 | 3,044 | 3,486 |
|  | HS, 40 m/s | Total distance (m) | 189.9 | 190.4 | 187.9 | 188.5 | 187.8 | 199.9 | 183.8 |
|  |  | Total distance relative to Comparative Example 3 (m) | −10.0 | −9.5 | −12.0 | −11.4 | −12.1 | 0.0 | −16.1 |
|  |  | Rating | good | good | fair | fair | NG | good | NG |
|  | W#1 | Spin rate (rpm) | 3,121 | 3,061 | 2,945 | 3,169 | 3,020 | 3,046 | 3,283 |
|  | HS, 35 m/s | Total distance (m) | 160.6 | 160.1 | 160.8 | 160.1 | 159.2 | 168.9 | 155.2 |
|  |  | Total distance relative to Comparative Example 3 (m) | −8.3 | −8.8 | −8.1 | −8.8 | −9.7 | 0.0 | −13.7 |
|  |  | Rating | good | good | good | good | good | good | NG |
|  | I#6 | Spin rate (rpm) | 5,959 | 5,747 | 5,462 | 6,287 | 5,759 | 5,441 | 6,119 |
|  | HS, 38 m/s | Total distance (m) | 142.9 | 144.9 | 145.8 | 139.9 | 143.8 | 152.8 | 143.6 |
|  |  | Total distance relative to Comparative Example 3 (m) | −9.9 | −7.9 | −7.0 | −12.9 | −9.0 | 0.0 | −9.2 |
|  |  | Rating | good | good | good | NG | good | good | good |
|  | I#6 | Spin rate (rpm) | 5,580 | 5,375 | 5,050 | 5,912 | 5,327 | 5,060 | 5,757 |
|  | HS, 34 m/s | Total distance (m) | 129.1 | 129.4 | 129.7 | 126.1 | 130.6 | 139.4 | 130.4 |
|  |  | Total distance relative to Comparative Example 3 (m) | −10.3 | −10.0 | −9.7 | −13.3 | −8.8 | 0.0 | −9.0 |
|  |  | Rating | good | good | good | NG | good | good | good |
| Approach shots | SW HS, 15 m/s | Spin rate (rpm) Rating | 4,952 good | 4,861 good | 4,729 good | 5,015 good | 4,800 good | 4,977 good | 4,873 good |

As demonstrated by the results in Table 5, the golf balls of Comparative Examples 1 to 4 are inferior in the following respects to the golf balls according to the present invention that are obtained in Examples 1 to 3.

In Comparative Example 1, the value of {(surface area C+surface area D)−(surface area A+surface area B)}×(Cs−Cc) is less than 30. As a result, the distance traveled by the ball when struck with an iron (I #6) drops off too much.

In Comparative Example 2, the value of {(surface area C+surface area D)−(surface area A+surface area B)}×(Cs−Cc) is less than 30. As a result, the distance traveled by the ball when struck with a driver (W #1; HS=40 m/s) drops off too much.

The ball in Comparative Example 3 corresponds to a tour ball currently used by professional golfers and skilled amateurs and has an initial velocity higher than 75.0 m/s. Moreover, the ball travels too far on driver (W #1) shots by a power hitter.

The ball in Comparative Example 4 corresponds to a practice ball with a two-piece construction for driving ranges and lacks an intermediate layer that is harder than the cover. Also, the value of {(surface area C+surface area D)−(surface area A+surface area B)}×(Cs−Cc) calculated from the core hardness profile is less than 30. As a result, the distance traveled on driver (W #1) shots by average hitters at head speeds of 40 m/s and 35 m/s drops off too much.

Japanese Patent Application No. 2022-141169 is incorporated herein by reference. Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A multi-piece solid golf ball comprising a core, an intermediate layer and a cover, wherein the sphere obtained by encasing the core with the intermediate layer has a surface hardness and the ball has a surface hardness which together satisfy the following condition:

(surface hardness of ball)<(surface hardness of intermediate layer-encased sphere);

the ball has an initial velocity of not more than 75.0 m/s; and the core has a hardness profile such that, letting Cc be the Shore C hardness at a center of the core, Cs be the Shore C hardness at a surface of the core, Cm be the Shore C hardness at a midpoint M between the core center and the core surface, Cm−2, Cm−4 and Cm−6 be the respective Shore C hardnesses at positions 2 mm, 4 mm and 6 mm inward from the midpoint M and Cm+2, Cm+4 and Cm+6 be the respective Shore C hardnesses at positions 2 mm, 4 mm and 6 mm outward from the midpoint M and defining surface areas A to F as follows surface area $A: \frac{1}{2} \times 2 \times (Cm-4-Cm-6)$ surface area $B: \frac{1}{2} \times 2 \times (Cm-2-Cm-4)$ surface area $C: \frac{1}{2} \times 2 \times (Cm-Cm-2)$ surface area $D: \frac{1}{2} \times 2 \times (Cm+2-Cm)$ surface area $E: \frac{1}{2} \times 2 \times (Cm+4-Cm+2)$ surface area $F: \frac{1}{2} \times 2 \times (Cm+6-Cm+4)$, the core satisfies the condition:

{(surface area C+surface area D)−(surface area A+surface area B)}×(Cs−Cc)≥30, and wherein the core is formed of a rubber composition comprising:
(A) a base rubber consisting of from 50 to 100 wt % of a styrene butadiene rubber and from 0 to 50 wt % of another diene rubber,
(B) a co-crosslinking agent including zinc acrylate,
(C) water or a metal monocarboxylate, and
(D) an organic peroxide.

2. The golf ball of claim 1, wherein the ball satisfies the following condition in the core hardness profile:

(Cs−Cc)≥15.

3. The golf ball of claim 1, wherein the ball satisfies the following condition in the core hardness profile:

> surface area $B$<surface area $C$<(surface area $D$+surface area $E$).

4. The golf ball of claim 1, wherein the ball satisfies the following condition in the core hardness profile:

> surface area $A$≤surface area $B$<surface area $C$<(surface area $D$+surface area $E$).

5. The golf ball of claim 1 wherein, letting C, M and B be the respective deflections in millimeters of the core, the intermediate layer-encased sphere and the ball when each is compressed under an initial load of 1,275 N (130 kgf) from an initial load of 98 N (10 kgf), the ball satisfies the following two conditions:

> $0.46 \leq C-B \leq 0.85$
>
> $0.25 \leq C-M \leq 0.65$.

6. The golf ball of claim 1, wherein the ball has an initial velocity of from 73.0 to 75.0 m/s.

* * * * *